Nov. 22, 1955     L. E. KNAPP     2,724,599

RIDER CONTROLLED SELF-PROPELLED SNOW REMOVER OR THE LIKE

Filed Dec. 6, 1951

Leslie E. Knapp
*Inventor* by *Edward Taylor*
*Attorney*

United States Patent Office 2,724,599
Patented Nov. 22, 1955

2,724,599

RIDER CONTROLLED SELF-PROPELLED SNOW REMOVER OR THE LIKE

Leslie E. Knapp, Wethersfield, Conn., assignor to The Maxim Silencer Company, Hartford, Conn., a corporation of Connecticut Application December 6, 1951, Serial No. 260,189

6 Claims. (Cl. 280—62)

This invention relates to improvements in a rider controlled, self-propelled snow remover or the like which includes a chassis supported on a pair of wheels. The improvements relate more particularly to means for pivoting the chassis of such a device about the axis of its support wheels so as to raise and lower operating elements, such as the snow engaging elements of a snow remover.

It will be understood that the invention may be advantageously applied in the construction of many self-propelled devices such as plows and mowers and, therefore, the following description which refers specifically to a snow removing machine should not be construed as limiting the scope of the invention.

It is the general object of the invention to provide a simple arrangement for rider control of a self-propelled device such as a snow thrower or the like and to include means requiring little effort by the driver to raise or lower the operating elements of the device with respect to the ground.

Figure 1:
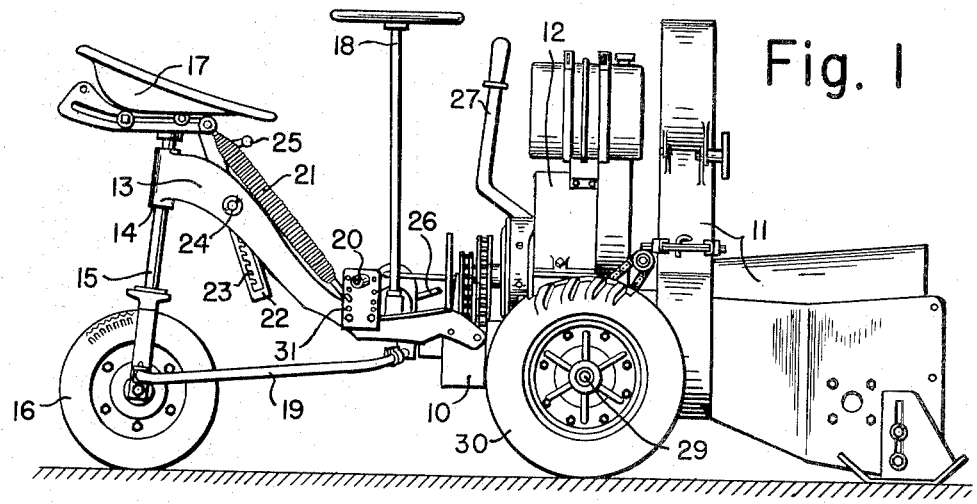
Figure 2:
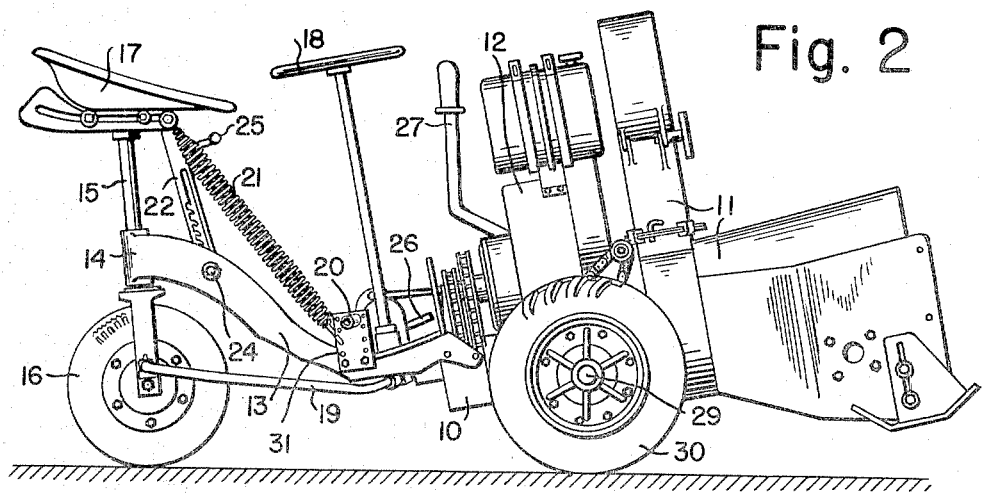
Figure 3:
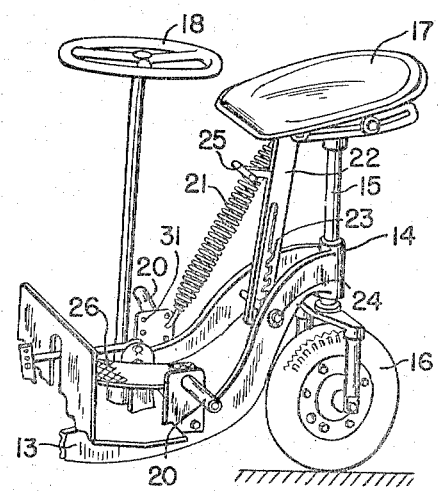

The invention will now be described with reference to the accompanying drawing, in which Fig. 1 is a side elevation of the snow thrower with the snow removing mechanism in normal or operating position;

Fig. 2 is a similar view with the snow removing mechanism held above the surface of the ground; and Fig. 3 is a detail in perspective looking from the opposite side of the machine.

As shown in the drawing, the snow removing device is provided in a self-propelled form which includes a chassis 10 supported on a pair of axially spaced wheels 30, 30. The snow engaging and removing apparatus is designated generally by the numeral 11 and includes elements normally disposed closely adjacent the ground and also includes elements for throwing the snow to the side of the path of movement. As shown, the said snow remover apparatus 11 is mounted on the chassis 10 forwardly of the axle 29 which extends between the wheels 30, 30. An engine 12 is also mounted on the chassis 10 substantially over the axle 29 for driving the wheels 30, 30 and for operating the snow removing apparatus 11. Included in the drive mechanism and transmission for the wheels 30, 30 and the snow removing apparatus 11 is a clutch pedal 26 and a gear shift lever 28. Since neither the snow removing apparatus nor the drive and transmission system form a part of the present invention, they have not been shown or described in detail.

The invention resides in the construction and arrangement of a rearwardly projecting chassis which is adapted to accommodate a rider and to be operated by said rider to selectively tilt or rock the chassis 10 on the wheel axle 29 for the purpose of raising or lowering the snow removing apparatus 11. More specifically, the rearwardly projecting extension of the chassis 10 comprises an A-shaped frame 13 which not only projects rearwardly but is also curved to extend upwardly as well. That is, the apex portion of the A-frame projects rearwardly and upwardly and the base portion thereof is secured to the chassis 10 rearwardly of the axle 29. While the said A-frame may be formed as an integral part of the main chassis 10, it is preferred that the same be detachably secured to the said chassis.

A tubular sleeve 14 is formed in the apex of the A-frame 13 for sliding movement along a post 15 which is substantially vertically disposed and which at its lower end is secured to a fork which rotatably mounts a third wheel 16. In the top of the post 15 suitable support structure is provided to retain a seat 17 in such a manner that rotation of the post 15, as may be caused by steering movement of the wheel 16, will not cause turning of the seat 17. It will be quite apparent that when a rider is seated on the seat 17 substantially all of his weight will be carried by the third wheel 16. The third wheel 16 is also utilized to guide or steer the snow remover over selected paths under the control of a manually operable steering assembly 18 which includes a steering wheel secured to the upper end of a vertically extending steering column and a drag link 19 which is connected between the fork supporting the third wheel 16 and the said steering column.

In normal or ground engaging position of the snow removing apparatus 11, the chasis 10 is disposed in a substantially horizontal plane as shown in Fig. 1 and the seat 17 on the upper end of the post 15 is disposed substantially vertically over the axis of the third wheel 16, but slightly forwardly thereof. It will be quite apparent that an operator who is seated in the seat 17 has ready access to the steering assembly 18 and to the gear shift lever 27 and clutch pedal 26. There is also provided a pair of plates which are secured, respectively, to the sides of the A-frame 13 adjacent its base and each of said plates supports a foot rest 20. Thus, a driver can be seated in the seat 17 with his feet on the rests 20, 20. He can steer the snow thrower in any desired path of movement whether the snow removing apparatus 11 be in operating position or elevated into non-operating position.

In elevating the snow removing apparatus 11 by pivoting the chassis about the wheel axle 29, the sleeve 14 slides along the post 15 from a position adjacent the seat 17 on the upper end thereof to a position adjacent the fork on the lower end thereof. This pivoting movement of the chassis and shifting of the A-frame sleeve 14 on the post 15 may be easily effected by the operator or rider who accomplishes the same by shifting part of his weight from the seat 17 on to the foot rests 20 while at the same time pulling rearwardly on the steering assembly 18 to further assist in pivoting the chasis 10. In this manner, the chassis 10 and snow removing apparatus 11 are shifted from the position shown in Fig. 1 to the position shown in Fig. 2. In the Fig. 2 position, the post 15 and seat 17 have shifted so that the seat is slightly to the rear of the axis of the third wheel 16.

It will be readily understood that it is desirable to have the chassis substantially in balance about the wheel axle 29 to minimize the effort required in shifting the chassis from one position to another. To this end, a counterbalancing spring 21 is secured between the structure supporting the seat 17 and one of the plates which support the foot rests 20, 20. A plurality of holes 31, 31 are provided in the said one foot rest plate for selectively securing the spring 21 and for adjusting the spring force. Said spring 21 tends to retain the chassis 10 in the position shown in Fig. 1 wherein the snow removing apparatus 11 is in operating or snow removing position and thus the spring 21 must be elongated to pivot the chassis 10 to the position shown in Fig. 2. In addition to biasing the chassis 10 toward the Fig. 1 position, the spring 21 also tends to counteract the torque imposed on the chassis by the drive engine 12.

In further accord with the invention it is not necessary for the driver to continue to exert force on the foot rests 20, 20 to retain the chassis in the position shown in Fig. 2 against the force of the spring 21. More specifically, a slotted latch bar 22 is pivotally connected beneath the seat 17 to engage a transversely extending pin 24 on the A-frame 13 in selected tilted positions of the chassis 10. When the chassis is pivoted from the position shown in Fig. 1 toward the position shown in Fig. 2 in the manner previously described, the driver can engage the latch bar 22 with the pin 24 in a selected pivoted position of the chassis 10 by grasping a handle 25 provided on the latch bar and by pivoting the latch bar into engagement with the said pin. The arrangement of the notches 23, 23 in the latch bar 22 is such as to prevent inadvertent disengagement from the pin 24. In order to disengage the latch bar 22 and pin 24, the driver need only pull the steering assembly 18 toward himself to tilt the chassis a little more and thereby disengage the pin 24 from the notches 23, 23. Then, the spring 21 can be relied upon to pull the A-frame extension 13 upwardly and thereby pivot the chassis 10 so as to bring the snow removing apparatus into operating or snow removing position.

It is important to observe that the weight of the rider or driver is substantially supported by the third wheel 16 and has little, if any, effect on the balance of the chassis 10. The weight of the rider is utilized only for the purpose of raising the snow removing apparatus and the only driver effort encountered is in shifting a portion of his weight onto the foot rests 20, 20 from the seat 17 while pulling rearwardly on the steering assembly 18.

What I claim is:

1. In a self-propelled snow removing device or the like which has a chassis supported on a pair of wheels and pivotable thereabout to lower and raise the portion of the chassis forwardly of the wheels to and from operating position with respect to the ground, the combination comprising a rearwardly projecting extension on said chassis having a sleeve rearwardly of said wheels, a substantially vertically disposed post received for relative sliding movement within said sleeve, a third wheel rotatably connected to the bottom of said post, a seat connected to the top of said post whereby a substantial portion of the weight of a seated operator will be borne by said third wheel and whereby shifting at least part of the weight of the operator from said seat to said extension will pivot said chassis and raise the forward portion thereof, and means biasing said extension upwardly.

2. In a self-propelled snow removing device or the like which has a chassis supported on a pair of wheels and pivotable thereabout to lower and raise the portion of the chassis forwardly of the wheels to and from operating position with respect to the ground, the combination comprising a rearwardly projecting extension on said chassis having a sleeve rearwardly of said wheels, a substantially vertically disposed post received for relative sliding movement within said sleeve, a third wheel rotatably connected to the bottom of said post, a seat connected to the top of said post whereby a substantial portion of the weight of a seated operator will be borne by said third wheel and whereby shifting at least part of the weight of the operator from said seat to said extension will pivot said chassis and raise the forward portion thereof, and a spring connected between the top of said post and said extension to bias said extension upwardly.

3. In a self-propelled snow removing device or the like which has a chassis supported on a pair of wheels and pivotable thereabout to lower and raise the portion of the chassis forwardly of the wheels to and from operating position with respect to the ground, the combination comprising a generally A-shaped frame extension on said chassis which has its apex projecting rearwardly of said wheels and which apex defines a sleeve, a substantially vertically disposed post received for relative sliding movement within said sleeve, a third wheel rotatably connected to the bottom of said post, a seat connected to the top of said post whereby a substantial portion of the weight of a seated operator will be borne by said third wheel and whereby shifting at least part of the weight of the operator from said seat to said A-frame extension will pivot said chassis and raise the forward portion thereof, and a coil spring connected between the top of said post and said A-frame extension to bias said extension upwardly.

4. In a self-propelled snow removing device or the like which has a chassis supported on a pair of wheels and pivotable thereabouts to lower and raise the portion of the chassis forwardly of the wheels to and from operating position with respect to the ground, the combination comprising a rearwardly projecting extension on said chassis having a sleeve rearwardly of said wheels, a substantially vertically disposed post received for relative sliding movement within said sleeve, a third wheel rotatably connected to the bottom of said post, a seat connected to the top of said post whereby a substantial portion of the weight of a seated operaor will be borne by said third wheel and whereby shifting at least part of the weight of the operator from said seat to said extension will pivot said chassis and raise the forward portion thereof, means biasing said extension upwardly, and a latch bar secured adjacent the top of said post and engageable with said extension in selected pivoted positions of said chassis.

5. In a self-propelled snow removing device or the like which has a chassis supported on a pair of wheels and pivotable thereabout to lower and raise the portion of the chassis forwardly of the wheels to and from operating position with respect to the ground, the combination comprising a generally A-shaped frame extension on said chassis having its apex projecting rearwardly of said wheels which apex defines a sleeve, a substantially vertically disposed post received for relative sliding movement within said sleeve, a third wheel rotatably connected to the bottom of said post, a seat connected to the top of said post whereby a substantial portion of the weight of a seated operator will be borne by said third wheel and whereby shifting at least part of the weight of the operator from said seat to said extension will pivot said chassis and raise the forward portion thereof, a coil spring connected between said seat and said A-frame extension to bias said extension upwardly, and a latch bar pivotally connected to said seat and engageable with said A-frame extension to retain the same in selected pivoted positions of said chassis.

6. In a self-propelled snow removing device or the like which has a chassis supported on a pair of wheels and pivotable thereabout to lower and raise the portion of the chassis forwardly of the wheels to and from operating position with respect to the ground, the combination comprising a steering assembly including a steering column and a steering wheel, a generally A-shaped frame extension on said chassis having its apex projecting rearwardly of said wheels and defining a sleeve, a substantially vertically disposed post received for relative sliding movement within said sleeve, a third wheel rotatably connected to the bottom of said post and having connections to said steering column for guiding said device over a selected path of movement, a seat connected to the top of said post whereby a substantial portion of the weight of a seated operator will be borne by said third wheel and whereby the operator can pivot said chassis to raise the forward portion thereof by pulling rearwardly on said steering assembly while shifting at least a portion of his weight from the seat to said A-frame extension, a coil spring adjustably connected between said seat and said A-frame extension to bias said extension upwardly, and a manually operable latch bar pivotally connected to said seat and engageable with said A-frame extension in selected pivoted positions of said chassis.

References Cited in the file of this patent

UNITED STATES PATENTS 1,047,507     Delvin _____ Dec. 17, 1912

(Other references on following page)

UNITED STATES PATENTS

| | | |
|---|---|---|
| 1,106,529 | Walton et al. | Aug. 11, 1914 |
| 1,198,121 | Gleiche | Sept. 12, 1916 |
| 1,486,548 | Schrum | Mar. 11, 1924 |
| 1,577,561 | Chiles | Mar. 23, 1926 |
| 2,086,774 | Loomis | July 13, 1937 |
| 2,151,117 | Kepler | Mar. 21, 1939 |
| 2,171,075 | Blazier | Aug. 29, 1939 |
| 2,375,965 | Turtle | May 15, 1945 |

FOREIGN PATENTS

| | | |
|---|---|---|
| 266,753 | Germany | Nov. 1, 1913 |
| 435,621 | Italy | May 18, 1948 |